United States Patent
Kalmus

(10) Patent No.: US 8,201,860 B2
(45) Date of Patent: Jun. 19, 2012

(54) VEHICLE DOOR PROTECTION DEVICE

(76) Inventor: John W. Kalmus, Hollywood, MD (US)

( * ) Notice: Subject to any disclaimer, the term of this patent is extended or adjusted under 35 U.S.C. 154(b) by 250 days.

(21) Appl. No.: 12/591,748

(22) Filed: Nov. 30, 2009

(65) Prior Publication Data

US 2011/0127782 A1 Jun. 2, 2011

(51) Int. Cl.
*B60J 11/06* (2006.01)
*B60R 13/04* (2006.01)
*B60R 19/42* (2006.01)

(52) U.S. Cl. ........................................ 293/128; 280/770

(58) Field of Classification Search ................. 52/716.5; 150/166; 280/770; 293/128; 296/187.12; 428/31

See application file for complete search history.

(56) References Cited

U.S. PATENT DOCUMENTS

| | | | | |
|---|---|---|---|---|
| 1,457,259 A | * | 5/1923 | Malluk et al. | 293/107 |
| 2,239,422 A | * | 4/1941 | Hayashi | 116/28 R |
| 2,496,910 A | * | 2/1950 | Fridolph | 160/127 |
| 2,734,765 A | * | 2/1956 | Henderson | 293/128 |
| 3,777,438 A | * | 12/1973 | Brown | 52/718.04 |
| 4,221,412 A | * | 9/1980 | Miller | 293/118 |
| 4,398,758 A | | 8/1983 | Tabares | |
| 4,531,560 A | * | 7/1985 | Balanky | 150/166 |
| 4,666,196 A | * | 5/1987 | McCoy et al. | 293/128 |
| 4,707,008 A | * | 11/1987 | Falco | 293/128 |
| 4,911,971 A | * | 3/1990 | McCue et al. | 428/99 |
| 5,037,148 A | * | 8/1991 | Kennedy | 293/128 |
| 5,050,925 A | | 9/1991 | Brown | |
| 5,072,979 A | | 12/1991 | Swinton | |
| 5,188,407 A | | 2/1993 | Villaveces et al. | |
| 5,267,763 A | | 12/1993 | Klein | |
| 5,320,392 A | | 6/1994 | Hart | |
| 6,311,451 B1 | | 11/2001 | Wise | |
| 6,926,339 B2 | | 8/2005 | Gentile | |
| 7,090,266 B1 | | 8/2006 | Price | |
| 7,229,108 B2 | | 6/2007 | Hochrein | |
| 7,517,001 B1 | | 4/2009 | Goldbaum | |
| 2002/0105197 A1 | | 8/2002 | Unterwagner | |
| 2003/0062732 A1 | | 4/2003 | Molina | |

FOREIGN PATENT DOCUMENTS

| | | | | |
|---|---|---|---|---|
| GB | 2200870 A | * | 8/1988 | |
| GB | 2437722 A | | 11/2007 | |
| JP | 60047742 A | * | 3/1985 | |

* cited by examiner

*Primary Examiner* — Glenn Dayoan
*Assistant Examiner* — Paul Chenevert
(74) *Attorney, Agent, or Firm* — Richard C. Litman

(57) ABSTRACT

The vehicle door protection device is a removable device for prevention of dents and other damage to a vehicle door, such as damage typically caused by the opening of an adjacent vehicle door. The vehicle door protection device includes an elongated base having opposed inner and outer surfaces, and an elongated fin joined to the outer surface of the base and projecting orthogonal thereto. The elongated base and elongated fin are preferably formed from high impact plastic or the like. The elongated fin preferably has a main body portion with an outer edge of increased thickness, enhancing the rigidity thereof. The inner surface of the base is releasably secured to an exterior face of the vehicle door by a magnetic layer secured to the inner surface. Alternatively, for vehicles having bodies formed from fiberglass or the like, the inner surface may have at least one suction cup secured thereto.

6 Claims, 3 Drawing Sheets

VEHICLE DOOR PROTECTION DEVICE

BACKGROUND OF THE INVENTION

1. Field of the Invention

The present invention relates to protective devices for preventing or limiting damage to an automobile, and particularly to a vehicle door protection device for the prevention of dents and other damage to a vehicle door.

2. Description of the Related Art

Vehicles, such as automobiles, vans, pickup trucks and the like, are often damaged in parking lots, when the door of an adjacent vehicle is opened and comes into contact with the side panel or door panel of the vehicle. The damage often includes scratches, dents and chipped paint. Such damage reduces the aesthetic appearance of the vehicle, and also renders the body of the vehicle susceptible to corrosion, thus reducing the vehicle's resale value, and providing the owner with potentially expensive and dangerous damage.

The use of factory-mounted protector strips affixed to the side panels and door panels of an automobile is known. Such protective strips typically include a unitary body formed from rubber or plastic, which projects slightly beyond the car body. This type of protector will prevent damage if the contact occurs against the protector, and is thus positioned where another car's door is most likely to contact the side or door panel. However, because the door protector strip increases the effective width of the car, the extent to which it can project beyond the car's door and side panels must necessarily be limited because it is permanently attached to the vehicle body, even when the car is in use. This commensurately reduces the chances that a neighboring vehicle's car door will impact against the protective strip when it hits the side or door panel of the car.

Thus, a vehicle door protection device solving the aforementioned problems is desired.

SUMMARY OF THE INVENTION

The vehicle door protection device is a removable device for prevention of dents and other damage to a vehicle door, such as damage typically caused by the opening of an adjacent vehicle door. The vehicle door protection device includes an elongated base having opposed inner and outer surfaces, and an elongated fin joined to the outer surface of the elongated base and projecting substantially orthogonal thereto. The elongated base and elongated fin are preferably formed from high impact plastic or the like. The elongated fin preferably includes a main body portion and a longitudinally extending outer edge having a bead or a flange extending along the outer edge for increased thickness, thus increasing the rigidity thereof.

The inner surface of the elongated base is releasably secured to an exterior face of the vehicle door by a magnetic layer attached to the inner surface. Alternatively, for vehicles having bodies formed from fiberglass or other non-paramagnetic materials, the inner surface may have at least one suction cup secured thereto.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
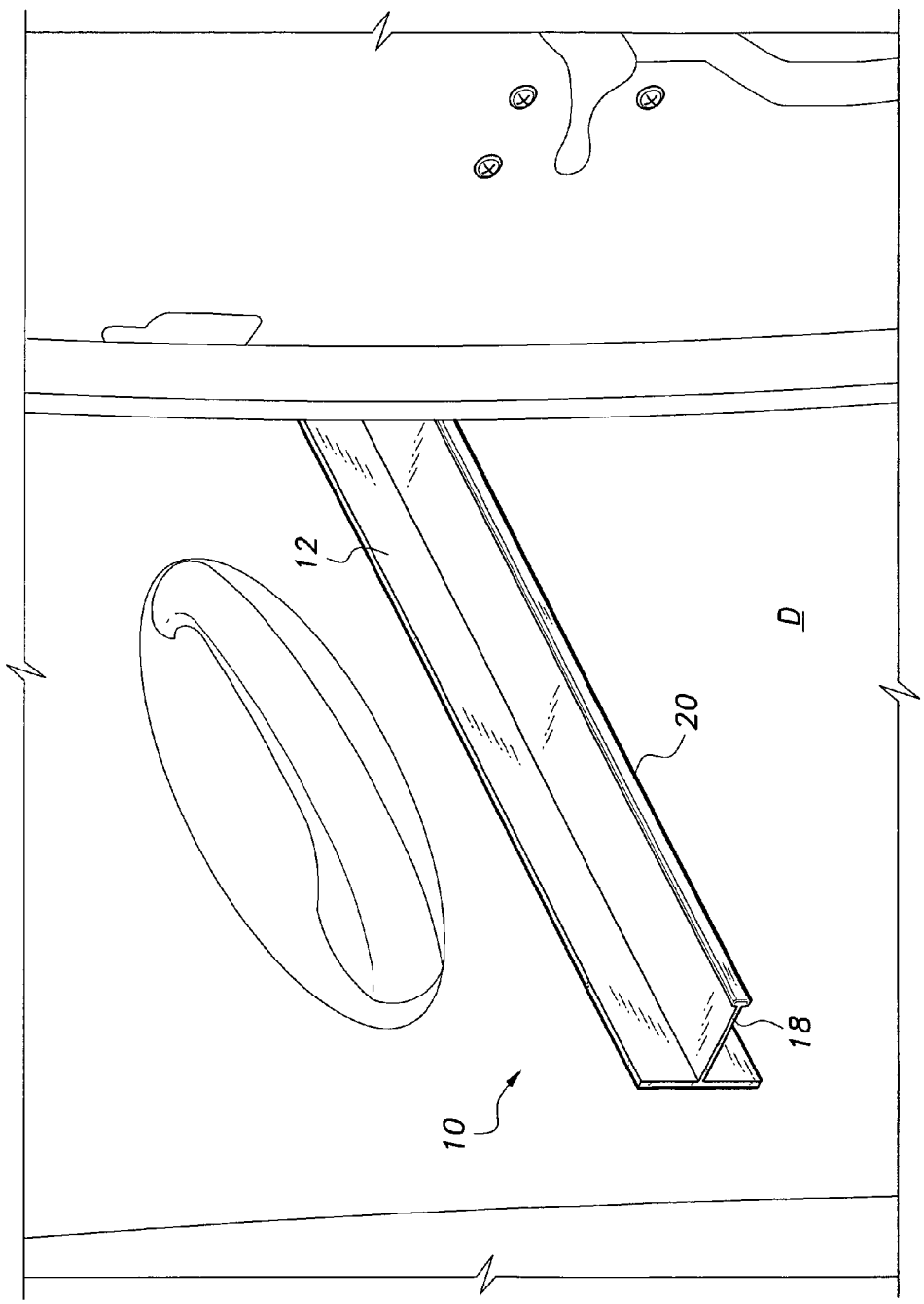
FIG. 1 is an environmental, perspective view of a vehicle door protection device according to the present invention.
Figure 2:
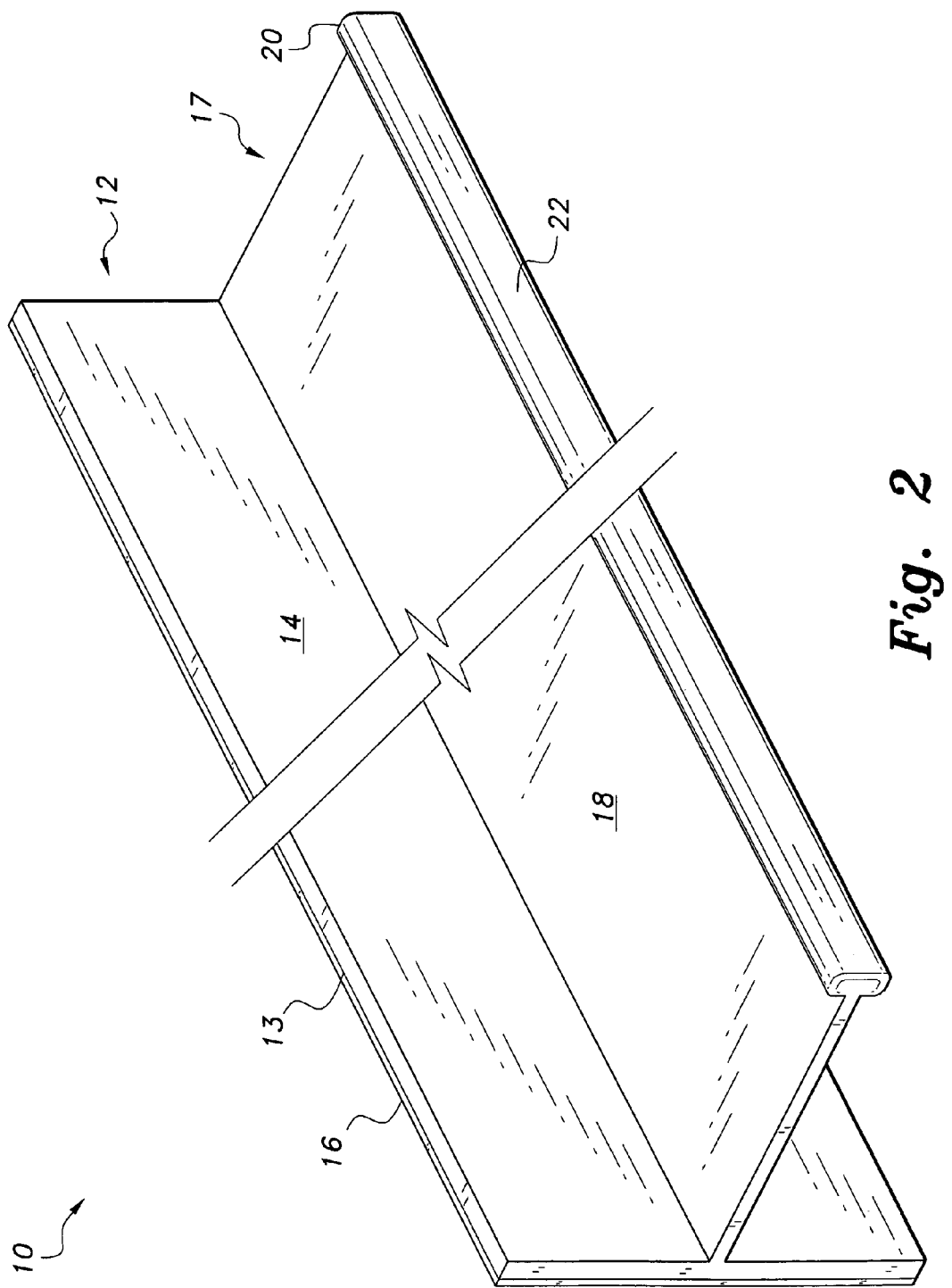
FIG. 2 is a perspective view of the vehicle door protection device according to the present invention.

FIGS. 1 and 2 show a first embodiment of a vehicle door protection device, designated generally as 10 in the drawings. The vehicle door protection device 10 is a removable device for prevention of dents and other damage to a vehicle door D, such as damage typically caused by the opening of an adjacent vehicle door. As best shown in FIG. 2, the vehicle door protection device 10 includes an elongated base 12 having opposed inner and outer surfaces 13, 14, respectively. Elongated base 12 is preferably dimensioned with a length allowing the base 12 to extend across a substantial portion of vehicle door D. In the Figures, the base 12 is shown as being an elongated rectangle, although it should be understood that base 12 may have any desired configuration for supporting the fin 18.

An elongated fin 18 is joined to or extends from the outer surface 14 of the elongated base 12 and projects substantially orthogonal thereto. The elongated fin 18 preferably is substantially rectangular and extends along the entire length of the base 12. Preferably, the elongated fin 18 is positioned along the longitudinal centerline of base 12, and the elongated fin 18 and the base 12 are both relatively thin. Base 12 and elongated fin 18 are preferably oriented so that the elongated fin 18 is substantially parallel with ground level, thus reducing any possible negative aerodynamic effects.

The elongated base 12 and the elongated fin 18 are preferably formed from high impact plastic or the like. The elongated fin 18 preferably includes a main body portion 17 that may have a thickened bead extending along its outer edge or a longitudinally extending outer flange 20 orthogonal to the main body portion and parallel to the base, presenting an outer impact surface 22 and increasing the rigidity of the fin 18. This provides extra protection along the edge, where the actual shock and blows of contact with adjacent vehicle doors occurs. The outer edges and corners of the fin 18 may be rounded for ease in handling when applying the device 10 to the door or removing the device 10 from the door.

The inner surface 13 of the elongated base 12 is releasably attached to an exterior face of the vehicle door D by a magnetic layer 16 attached to the inner surface 13. Magnetic layer 16 may be fixed to the inner surface 13 by adhesive or other permanent bonding.

Figure 3:
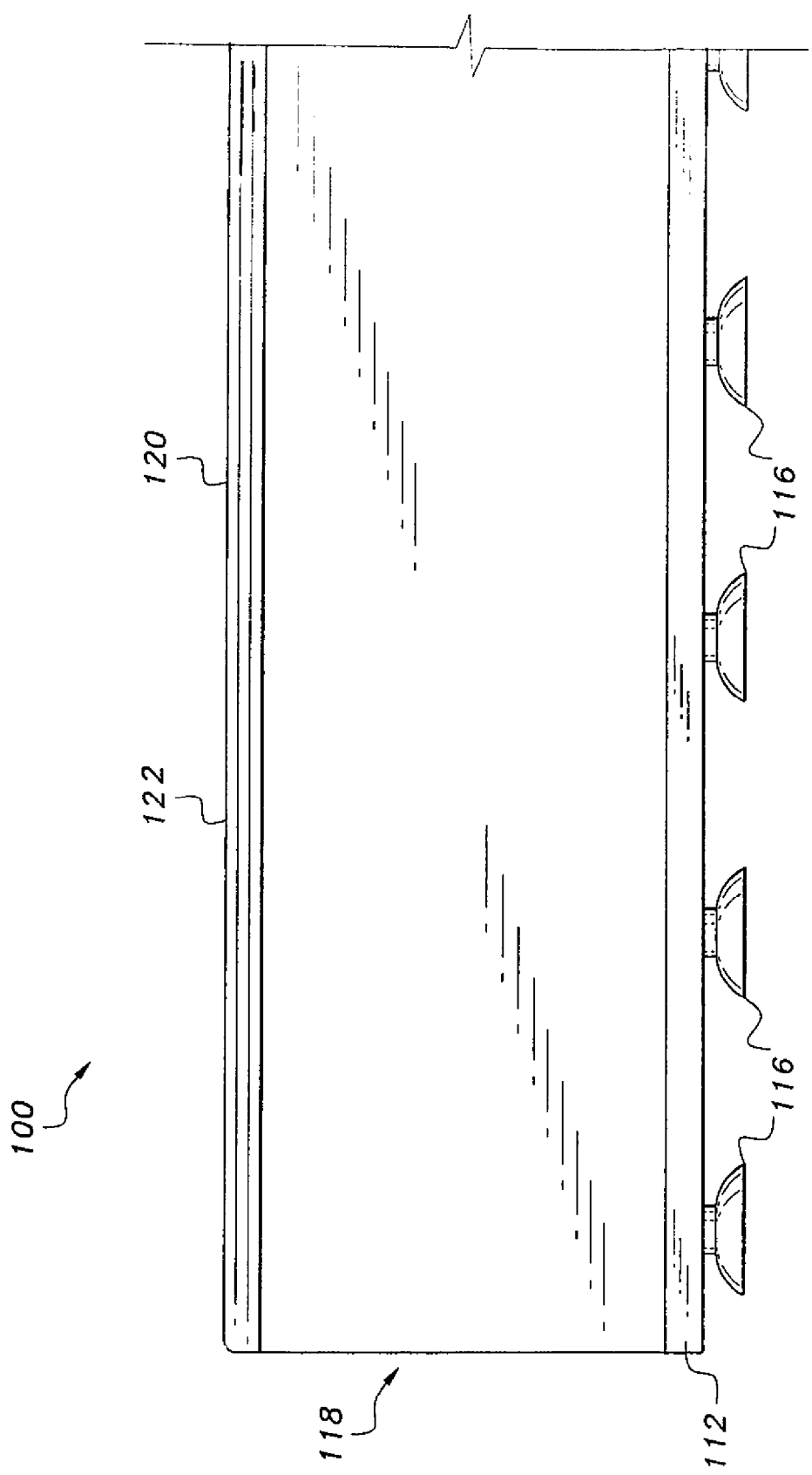
FIG. 3 is a side view of an alternative embodiment of a vehicle door protection device according to the present invention.

FIG. 3 illustrates an alternative embodiment of a vehicle door protection device 100, including an elongated base 112, an elongated fin 118, and a thicker outer edge 120 presenting an impact face 122, each similar to the corresponding elements of the embodiment of FIGS. 1 and 2. In FIG. 3, the magnetic layer 16 of device 10 has been replaced by a plurality of suction cups 116 or the like, allowing base 112 to be releasably attached to a vehicle door D of a vehicle with a body formed from fiberglass or other non-paramagnetic materials. It should be understood that any suitable type of releasable attachment may be used to releasably attach the base 112 to door D, such as an adhesive layer or the like.

It is to be understood that the present invention is not limited to the embodiments described above, but encompasses any and all embodiments within the scope of the following claims.

I claim:

1. A vehicle door protection device, consisting of:
    an elongated substantially planar rectangular base having opposed inner and outer surfaces and being of a finite length;
    a single, elongated substantially planar rectangular fin extending from and coextensive with the length of the outer surface of the elongated base and projecting substantially orthogonal thereto, the elongated fin being positioned along the centerline of the outer surface of the elongated base, the elongated fin having a main body portion defining a longitudinally extending outer edge and a thickened terminal unobstructed impact face; and
    means for releasably attaching the inner surface of the elongated base to an exterior face of a vehicle door.

2. The vehicle door protection device as recited in claim 1, wherein said thickened impact face comprises an elongated flange extending along the outer edge of said elongated fin orthogonal to the main body portion and parallel to said elongated base.

3. The vehicle door protection device as recited in claim 1, wherein said means for releasably attaching the inner surface of said elongated base to the exterior face of the vehicle door comprises a magnetic layer attached to the inner surface of said elongated base.

4. The vehicle door protection device as recited in claim 1, wherein said means for releasably attaching the inner surface of said elongated base to the exterior face of the vehicle door comprises at least one suction cup attached to the inner surface of said elongated base.

5. The vehicle door protection device as recited in claim 1, wherein said elongated base and said elongated fin are made from plastic.

6. The vehicle door protection device as recited in claim 1, wherein said elongated fin has rounded edges and corners.

* * * * *